(12) United States Patent
Steffen et al.

(10) Patent No.: US 8,226,168 B2
(45) Date of Patent: Jul. 24, 2012

(54) FITTING

(75) Inventors: Oliver Steffen, Coburg (DE); Frank Fassbender, Coburg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 12/947,464

(22) Filed: Nov. 16, 2010

(65) Prior Publication Data

US 2011/0089735 A1   Apr. 21, 2011

Related U.S. Application Data

(63) Continuation of application No. PCT/EP2009/003457, filed on May 15, 2009.

(30) Foreign Application Priority Data

May 16, 2008   (DE) .................. 10 2008 024 052

(51) Int. Cl.
*B60N 2/235* (2006.01)
(52) U.S. Cl. ................................ 297/367 R
(58) Field of Classification Search ............... 297/367 R
See application file for complete search history.

(56) References Cited

U.S. PATENT DOCUMENTS

| 6,332,649 | B1 * | 12/2001 | Vossmann ............... 297/367 R |
| 6,454,354 | B1 | 9/2002 | Vossmann et al. |
| 6,824,216 | B2 | 11/2004 | Uramichi |
| 7,458,639 | B2 * | 12/2008 | Thiel et al. ............ 297/367 R X |
| 7,946,652 | B2 * | 5/2011 | Stilleke et al. ............ 297/367 R |
| 2005/0217399 | A1 | 10/2005 | Dill et al. |
| 2006/0220430 | A1 | 10/2006 | Baloche Faurecia |

FOREIGN PATENT DOCUMENTS

| DE | 44 41 159 A1 | 5/1995 |
| DE | 199 04 300 C1 | 8/2000 |
| DE | 102 50 987 A1 | 5/2004 |
| DE | 10 2004 035 599 B3 | 1/2006 |
| DE | 10 2006 015 361 A1 | 10/2006 |
| DE | 103 05 407 B4 | 11/2006 |

* cited by examiner

*Primary Examiner* — Anthony D Barfield
(74) *Attorney, Agent, or Firm* — Muncy, Geissler, Olds & Lowe, PLLC

(57) ABSTRACT

A fitting for a vehicle seat is provided having a first fitting part, a second fitting part which is rotatable about an axis of rotation relative to the first fitting part, a locking bolt which is guided displaceably in a radical direction of displacement on the first fitting part and is intended for forming a locking mechanism with the second fitting part, and a driving element which is arranged movably between the fitting parts and is intended for the radical deployment and retrieving of the locking bolt. In order to seal the respective axial gap between the driving element and the fitting parts, a separate sealing component which provides a seal in relation to the axis of rotation is used. In the case of a fitting of this type, paint is prevented from penetrating via a central opening during a dip-coating process.

13 Claims, 2 Drawing Sheets

FITTING

This nonprovisional application is a continuation of International Application No. PCT/EP2009/003457, which was filed on May 15, 2009, and which claims priority to German Patent Application No. 10 2008 024 052.4, which was filed in Germany on May 16, 2008, and which are both herein incorporated by reference.

BACKGROUND OF THE INVENTION

1. Field of the Invention

The invention relates to a fitting, in particular for a vehicle seat, having a first fitting part, having a second fitting part which is rotatable about an axis of rotation relative to the first fitting part, having a locking bolt, which is guided displaceably in a radial direction of displacement on the first fitting part, to form a locking mechanism with the second fitting part, and having a driving element which is arranged movably between the fitting parts for the radial deployment and retraction of the locking bolt.

2. Description of the Background Art

A fitting of this type is used in particular for the positionable adjusting of a back rest of a vehicle seat relative to the seat base. For this purpose, for example, first the locking bolt is retracted by means of an operating lever via the driving element from its locking position, in which both fitting parts are locked relative to one another. Next, the fitting parts are adjusted relative to one another until a desired target position is reached, particularly by an inclination adjustment of the attached back rest, and the operating lever is released. The locking bolt, which is usually pretensioned by the driving element for the locking position, then returns to the locking position, so that the two fitting parts are now again locked in the target position. The back rest inclination is shifted and locked.

A fitting of the aforementioned type is disclosed, for example, in German Pat. App. No. DE 44 41 159 A1, which corresponds to U.S. Pat. No. 5,622,407, where the driving element has an actuating cam and a retracting pawl. In this case, the actuating cam rests radially against an end of the bolt and drives the locking bolt radially outward into its locking position. The retracting pawl engages in a corresponding pocket of the locking bolt and returns the locking bolt from its locking position radially inward back into its release position. The locking bolt can be moved back and forth, thereby between its locking position and its release position, by an alternate actuation of the driving element in opposite rotation directions.

Further, a fitting is also disclosed in U.S. Pat. No. 6,824,216 B2, where a driving element with a separate driving cam is provided, which drives a slide element transverse to the adjusting direction of the locking bolt. The sliding element has a retracting pawl and stop ramps, whereby the stop ramps in the interplay with the retracting pawl in the case of a lateral drive cause a back and forth movement of the locking bolt.

Further, a fitting of the aforementioned type is disclosed in German patent publication No. DE 10 2004 035 599 B3, which corresponds to U.S. Publication No. 20070145800, whereby to actuate the locking bolt a separate driving eccentric and a separate slotted disk are provided. The driving eccentric hereby drives the locking bolt radially outward into its locking position. The slotted disk works together with a pin of the locking bolt and returns the locking bolt from its locking position radially inward back to its release position. The locking bolt is moved back and forth thereby between its locking position and its release position by an alternate actuation of the driving element in opposite rotation directions.

Typically, a fitting of this type before its use is coated with a paint by a dip coating process, particularly by a cathodic dip coating process, to achieve a higher corrosion resistance. In this regard, penetration of the paint into the interior of the fitting must be prevented, because a paint that has penetrated also impacts undesirably the mechanical parts forming the locking mechanism. In this case specifically, the mechanical locking mechanism due to the applied paint may be formed merely insufficiently or not at all, so that in a locked fitting the transmissible torque can be reduced markedly. As a result, the crash resistance of the fitting no longer meets technical safety requirements.

SUMMARY OF THE INVENTION

It is therefore an object the invention to provide a fitting in which the penetration of paint into the interior during a dip coating process is made difficult with the simplest and cost-effective means possible.

This object is achieved for a fitting according to an embodiment of the invention in that a separate, elastic sealing component, sealing relative to the axis of rotation, is used to seal the respective axial gap between the driving element and the fitting parts.

In an embodiment, the indicated fitting can have a central, axial access to the driving element, to be able to actuate the driving element, disposed between the fitting parts, particularly via a drive shaft or the like. The driving element can be disposed movably between the fitting parts to actuate the locking bolt, for which purpose some axial play is necessary. Paint can easily reach the interior of the fitting, however, via an axial gap between the driving element and the fitting parts through the central access to the driving element in the case of dip coating and impact undesirably the mechanical parts for forming the locking mechanism between the locking bolt and the first fitting part.

However, if a separate, elastic sealing component, sealing relative to the axis of rotation, is used for sealing a specific axial gap between the driving element and the fitting parts, this access path for the paint is closed off.

Penetration of the paint into the interior of the fitting via a radial outer axial gap between the movably mounted fitting parts is impeded in addition, if the fitting parts are held against one another in the axial direction via an outer retaining ring, which covers the axial gap between the fitting parts and, in this respect, has a sealing function in terms of impeding penetration of paint.

The invention offers the further advantage that grease, present in the interior of the fitting, for lubrication or the like cannot be washed out during the dip coating process. In this respect, the sealing component has a double function, namely, the sealing of the interior from penetration of paint and from the escape of grease present in the interior.

The sealing component as such can be matched to the specific designs of the driving element and the fitting parts. In particular, it can be guided along the contour of the resulting axial gap. The sealing component itself can be made of one or multiple parts. Any elastomer is basically suitable as the elastic material for the sealing component, as long as it is sufficiently dimensionally stable and in particular withstands a cathodic dip coating process. In particular, the material is to withstand temperatures up to about 200° C. A suitable plastic or rubber is conceivable as a material. Preferably, a polyamide is used as a material for the sealing component.

In an embodiment, the driving element has a central recess for receiving a drive shaft, whereby the sealing element is disposed at the edge of the central recess. The central recess is made particularly irregular or in the form of a polygon, so that a form-fitting and rotationally fixed connection with a drive shaft can be made. The sealing component can then be guided outwardly along the edge of the recess and hereby seal the particular axial gap of the driving element relative to a fitting part. In the case of a one-part design, the sealing component will then penetrate the driving element, for example, by means of axial grooves or openings and hereby be affixed securely at the recess. The sealing of the axial gap can occur, for example, by means of seal lips of suitable form.

In a preferred embodiment variant, the driving element of the fitting comprises an actuating disk with an eccentric cam for the radial support of the locking bolt and a retracting disk, offset in the axial direction to the second fitting part, for retracting the locking bolt, whereby a first sealing element is disposed between the first fitting part and the actuating disk and a second sealing element between the second fitting part and the retracting disk.

The function of the disengagement of the locking bolt can be separated from the function of retraction by this design of the driving element. This is practical, because the radial deployment of the locking bolts corresponds to the locked state of the fitting in which high torques must be transmitted, whereas this is not necessary during the retraction of the locking bolt. A high torque transmission can be accomplished via an eccentric cam which is disposed at an actuating disk and on which the locking bolt rests. The necessary closing force of the locking mechanism can also be achieved via the eccentric cam acting against the locking bolt. The separation of the functions occurs via the axial offset of the retracting disk relative to the actuating disk. The sealing of the axial gap between the actuating disk and the first fitting part is realized by a first sealing element and the sealing between the retracting disk and the second fitting part by a second sealing element. If the actuating disk and the retracting disk are made movable against each other and particularly as separate structural elements, thus an additional sealing element for sealing the axial gap between the retracting disk and the actuating disk can be introduced. A sealing element of this type, however, is not necessary, provided the retracting disk and the actuating disk form a one-piece structural element.

The central recess can be introduced into the driving element, whereby the first fitting part has a central bore, in which a groove open toward the actuating disk is made, whose groove base has a larger diameter relative to the recess, and whereby a sealing ring is inserted in the groove as the first sealing element. Sealing of the axial gap between the driving element and the first fitting part is achieved by this design with simple and cost-effective means. The sealing ring is inserted here simply into the corresponding groove, whereby it acts elastically against the edge of the central recess of the driving element.

In another embodiment, the central recess can be introduced into the actuating disk and in each case a central bore into the retracting disk and into the second fitting part, whereby the central bore of the retracting disk has a larger diameter compared with the central recess of the actuating disk and compared with the bore of the second fitting part, and whereby as a second sealing element a sealing ring is inserted in the resulting annular gap between the second fitting part and the actuating disk.

In other words, in the embodiment variant mentioned last the inner circumference of the central bore of the retracting disk can be enlarged relative to the central recess in the actuating disk and relative to the central bore of the second fitting part, so that the corresponding edge of the retracting disk appears to be set back radially. This setting back of the inner edge of the retracting disk results in an annular gap between the actuating disk and the second fitting part. A sealing ring, which now seals in a simple manner not only the axial gap between the retracting disk and the second fitting part but at the same time an optionally present axial gap between the retracting disk and the actuating disk relative to the axis of rotation, is inserted in turn in this annular gap as a second sealing element. In other words, this construction makes it possible with a simple sealing ring to seal three structural parts against one another. The retracting disk and the actuating disk can be fabricated in this respect as separate structural elements with an axial play relative to one another.

In an embodiment, the groove now has at the first fitting part an axial width that corresponds approximately to the axial width of the retracting disk, so that identical sealing rings can be used in the annular gap and in the groove. In this embodiment, simply fabricated sealing rings with a uniform design can be used for sealing the axial gap between the fitting parts. The cost for the fitting can be considerably reduced because a single and structurally simply designed sealing means is used.

The second sealing ring can comprise two radially outwardly protruding projections, one of which engages between the retracting disk and the actuating disk and the other between the retracting disk and the second fitting part. In the case of a separate retracting disk, an axial distance of said disk in regard to the actuating disk, on the one hand, and in regard to the second fitting part, on the other, is created as a result. This prevents undesirable rattling noises of the fitting, which may be perceived as disturbing or as alarming by an occupant of a motor vehicle.

The sealing ring can be made, for example, as a simple O-ring. Preferably, the sealing ring or each sealing ring has a substantially U-shaped cross section with outwardly extending legs relative to the central axis of the U, whereby the legs are supported in the axial direction elastically on the boundary walls. As a result, secure sealing of the axial gap is achieved. Preferably, in this case, the legs point radially outward, as a result of which paint is securely turned away.

In another embodiment, the fitting parts can be held to one another in the axial direction by means of an outer retaining ring. Said retaining ring, as already mentioned, assumes a sealing function for the outer axial gap between the two fitting parts mounted rotatably to one another. As a result, penetration of paint is prevented in addition.

Further, the retaining ring can overlap the first fitting part axially, is connected there circumferentially to the first fitting part, and by means of a circumferential collar, angled inward against the radial direction, pretensions the first fitting part against the second fitting part. By means of this construction, the pretensioning of both fitting parts to one another can be adjusted in regard to the least play possible with sufficient movability. For the assembly, the retaining ring is guided axially over the fitting parts, until a certain pretensioning via the collar supported on the second fitting part is achieved, or until a desired position is achieved, and then connected circumferentially with the second fitting part. In a fitting of this type, thereby, also the penetration of paint into the axial gap between the fitting parts is completely prevented. The circumferential collar seals against the second fitting part and the circumferential connection against the first fitting part. The circumferential connection can be achieved, for example, via a weld seam, particularly via a fillet weld or a through weld. Laser welding in particular is a possibility for producing the weld seam.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
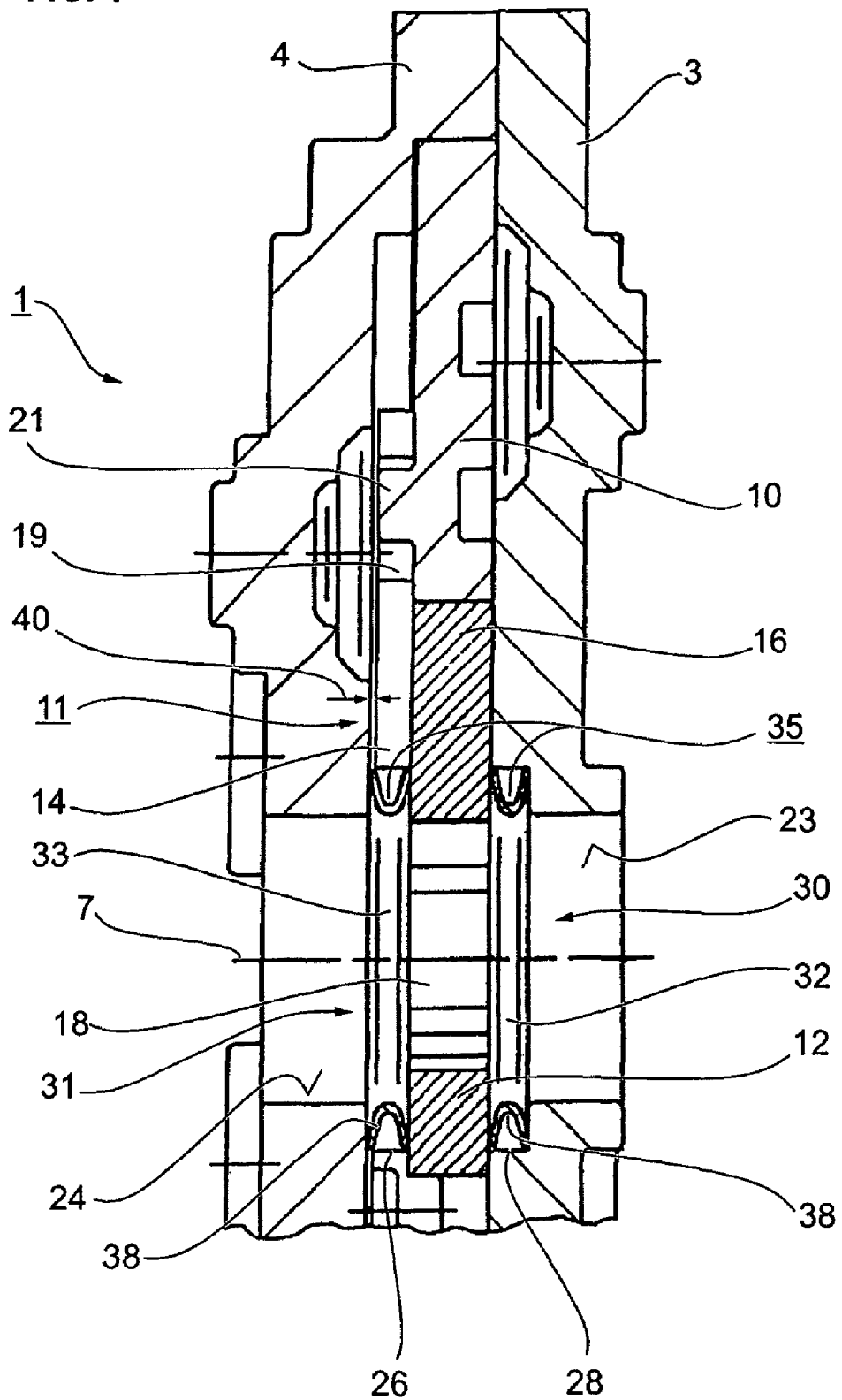
FIG. 1 shows in a cross section a first fitting with a separate sealing means, sealing relative to the axis of rotation.

FIG. 1 shows in a cross section a first fitting 1, as is suitable particularly for adjusting the back rest of a vehicle seat relative to the seat base. Fitting 1 comprises a first fitting part 3 and a second fitting part 4 relatively rotatable hereto. The axis of rotation 7, defining a cylindrical coordinate system, is evident around which both fitting parts 3, 4 are rotatable relative to one another. FIG. 1 shows a partial view of fitting 1, whereby the section view below axis of rotation 7 in the drawing is not shown completely in drawing terms. For fastening to a vehicle seat, for example, first fitting part 3 is connected optionally via an adapter plate to the seat base and second fitting part 4 fastened to the back rest.

In the interior of fitting 1, three locking bolts 10 are each arranged at an angle of 120° to one another. The section shown in FIG. 1 in this case runs through one of these locking bolts 10. Locking bolts 10 are guided displaceably on first fitting part 3 in the radial direction. In the shown position, locking bolts 10 are in their respective locking position, whereby locking teeth (not shown) at their outer radial end engage in a mating toothed section of second fitting part 4. Via this ratchet locking mechanism, second fitting part 4 in the shown position is locked relative to first fitting part 3.

To actuate locking bolt 10, a driving element 11 is disposed in the interior of fitting 1 between the first and second fitting part 3 or 4. Driving element 11 is made as two parts and comprises an actuating disk 12 and a retracting disk 14. In this case, retracting disk 14 is connected rotationally fixed to actuating disk 12. Actuating disk 12 comprises for each locking bolt 10 an eccentric cam 16, on which the particular locking bolt 10 is radially supported. In this regard, eccentric cam 16 has a decreasing radius along a predefined direction of motion, so that during a suitable actuation locking bolt 10 can be guided further radially inward. To actuate actuating disk 12, said disk has a central recess 18, which is made as a polygonal recess and can be connected hereby rotationally fixed to a drive shaft (not shown).

Retracting disk 14 in an actuation of actuating disk 12 causes a return of locking bolt 10 radially inward. To this end, in each case a slot 19, in which a pin 21 of the corresponding locking bolt 10 engages, is introduced in actuating disk 12 for each locking bolt 10. The path of slot 19 for this purpose runs at a radial distance, changing in the circumferential direction, toward axis of rotation 7.

In each case, a central bore 23 or 24 is introduced both in first fitting part 3 and in second fitting part 4. A drive shaft is inserted for a rotationally fixed fastening to actuating disk 12 via these central bores 23, 24. A central bore 26 is introduced in retracting disk 14 as well. It is evident that central bore 26 of retracting disk 14 has a greater radius compared with central bores 23, 24 of the first and second fitting part 3 or 4 and compared with central recess 18 of actuating disk 12. The inner circumference or edge of retracting disk 14 is set back in this respect relative to the inner edge of second fitting part 4 and the inner edge of actuating disk 12.

A circumferential groove 28, open toward actuating disk 12, is introduced in first fitting part 3, whereby the groove base has a greater diameter compared with central recess 18 of actuating disk 12. The axial width of groove 28 corresponds approximately to the axial width of retracting disk 14.

A first and second sealing element 30 or 31 is inserted in groove 28 and in the resulting annular gap between second fitting part 4 and actuating disk 12. Both sealing elements 30, 31 are formed in this case as sealing rings 32, 33. The two sealing rings 32, 33 together form a sealing component 35, which seals the axial gap of the individual structural elements of fitting 1 relative to the axis of rotation.

It becomes evident that second sealing ring 33 seals both the axial gap between second fitting part 4 and retracting disk 14 and the axial gap between retracting disk 14 and actuating disk 12 relative to the axis of rotation. Axial gap 40 between second fitting part 4 and actuating disk 12 is drawn in. Both sealing rings 32 and 33 are made identical.

Each sealing ring 32, 33 has an approximately U-shaped cross section 38, whereby the legs of the U widen toward the opening side. Sealing rings 32, 33 in this regard are inserted in fitting 1 such that the legs are directed radially outward. Sealing rings 32, 33 are made of polyamide. For sealing, the legs of sealing rings 32, 33 are supported in the axial direction against the corresponding boundary surfaces.

Figure 2:
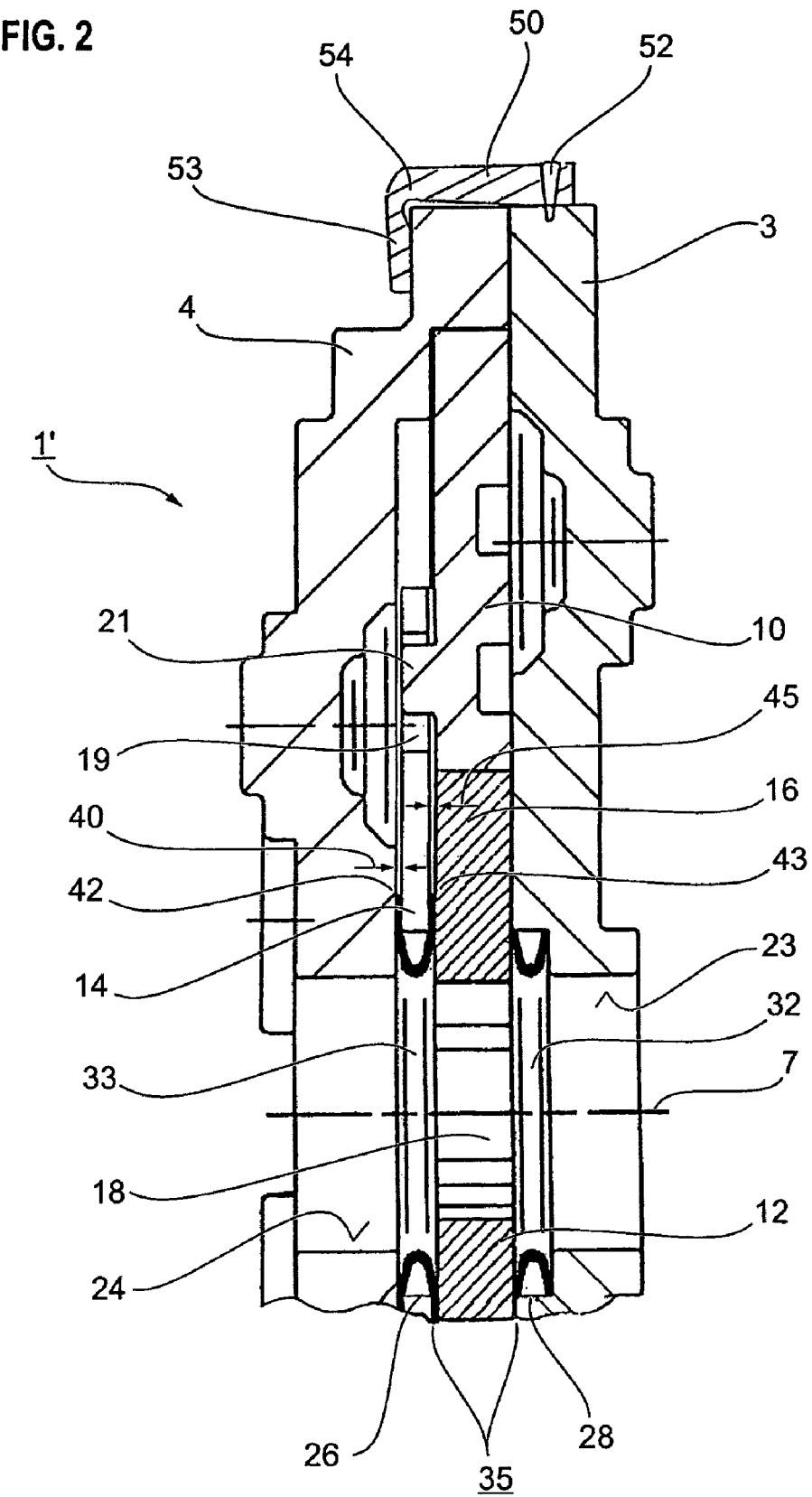
FIG. 2 shows in a cross section a second fitting with a separate sealing means sealing relative to the axis of rotation, whereby the fitting parts are held axially against one another by a retaining ring.

Another fitting 1' is shown in FIG. 2, in a section identical to FIG. 1. Identical parts here have identical reference characters.

Fitting 1' differs from fitting 1 shown in FIG. 1 in that second sealing ring 33 has a first projection 42 and a second projection 43 in the radial direction, whereby the first projection 42 extends into axial gap 40 between second fitting part 4 and retracting disk 14 and second projection 43 into axial gap 45 between retracting disk 14 and actuating disk 12.

A spaced mounting of retracting disk 14 between second fitting part 4 and actuating disk 12 is achieved by the two projections 42, 43 of second sealing ring 33. As a result, a rattle-free fitting 1' is created, because due to this distance predefined by second sealing ring 33, retracting disk 14 can no longer strike against the neighboring boundary surfaces.

Further, compared with fitting 1, fitting 1' has an outer retaining ring 50 by which the two fitting parts 3, 4 are held axially to one another. Retaining ring 50 is hereby rigidly connected to first fitting part 3 by a circumferential through weld 52. In the installed position, in this regard, retaining ring 50 by means of an overextending, circumferential collar 53, directed radially inward, produces a pretensioning of the two fitting parts 3, 4 to one another in the axial direction. The achievable pretension can be adjusted in this case by a groove 54 made on the inner shoulder of retaining ring 50. Via the circumferential through weld 52 and the adjacent, circumferential collar 53, fitting 1' has an additional sealing of the axial gap between the two fitting parts 3, 4.

Via the two internally disposed sealing rings 32 and 33, the axial gap between the individual structural elements of the shown fittings 1 and 1' are sealed relative to the axis of rotation 7. In a dip coating process and particularly in a cathodic dip coating process, paint therefore in fact enters into the central opening of fittings 1, 1'. Penetration of the paint via the axial gap between the individual structural elements to the outer ratchet teeth of locking bolt 10 is securely prevented, however. A reduction of the crash resistance by penetrated paint is no longer expected. In addition, the outer retaining ring 50 of second fitting 1' seals the radial gap between fitting parts 3 and 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fitting for a vehicle seat, the fitting comprising:
   a first fitting part;
   a second fitting part that is configured to be rotatable about an axis of rotation relative to the first fitting part;
   a locking bolt that is configured to be guided displaceably in a radial direction of displacement on the first fitting part to form a locking mechanism with the second fitting part;
   a driving element that is arranged movably between the first and second fitting parts for a radial deployment and retraction of the locking bolt; and
   a separate elastic sealing component that is configured to seal relative to the axis of rotation and is configured to seal a respective axial gap between the driving element and the first and second fitting parts.

2. The fitting according to claim 1, wherein a central recess configured to receive a drive shaft, at an edge of which the sealing component is disposed, is inserted in the driving element.

3. The fitting according to claim 1, wherein the driving element comprises an actuating disk having an eccentric cam for radial support of the locking bolt and a retracting disk that is offset in an axial direction to the second fitting part for retracting the locking bolt, and wherein the elastic sealing component comprises:
   a first sealing element that is disposed between the first fitting part and the actuating disk; and
   a second sealing element that is disposed between the second fitting part and the retracting disk.

4. The fitting according to claim 3, wherein a central recess is introduced into the driving element, wherein the first fitting part has a central bore in which a groove that is open toward the driving element is formed, wherein a groove base has a larger diameter relative to the central recess, and wherein a sealing ring is inserted in the groove as the first sealing element.

5. The fitting according to claim 3, wherein a central recess is introduced into the actuating disk and in each case a central bore into a retracting disk and into the second fitting part, wherein the central bore of the retracting disk has a larger diameter compared with the central recess of the actuating disk and compared with the bore of the second fitting part, and wherein as the second sealing element a sealing ring is inserted in the resulting annular gap between the second fitting part and the actuating disk.

6. The fitting according to claim 5, wherein the second sealing ring comprises two radially outwardly protruding projections, one of which engages between the retracting disk and the actuating disk and the other between the retracting disk and the second fitting part.

7. The fitting according to claim 4, wherein the axial width of the groove corresponds approximately to the axial width of the retracting disk, and wherein identical sealing rings are used in the annular gap and in the groove.

8. The fitting according to claim 4, wherein the sealing ring or each sealing ring has a substantially U-shaped cross section with outwardly extending legs, wherein the legs are supported in the axial direction elastically on boundary walls.

9. The fitting according to claim 8, wherein the legs point radially outward.

10. The fitting according to claim 1, wherein the sealing component is made of polyamide.

11. The fitting according to claim 1, wherein the fitting parts are held to one another in the axial direction by an outer retaining ring.

12. The fitting according to claim 11, wherein the retaining ring overlaps the first fitting part axially and is connected circumferentially to the first fitting part, via a circumferential collar is angled inward against the radial direction, and pretensions the first fitting part against the second fitting part.

13. The fitting according to claim 1, wherein a portion of the locking bolt directly engages the first fitting part and the second fitting part.

* * * * *